(12) United States Patent
Hnizdor

(10) Patent No.: US 6,219,955 B1
(45) Date of Patent: *Apr. 24, 2001

(54) ARTIFICIAL FLY/LURE

(75) Inventor: Thomas A. Hnizdor, Redford, MI (US)

(73) Assignee: B-17 Fly Tackle Limited, Redford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/661,700

(22) Filed: Sep. 14, 2000

Related U.S. Application Data

(63) Continuation-in-part of application No. 09/314,084, filed on May 18, 1999, now Pat. No. 6,122,856.

(51) Int. Cl.$^7$ .................................................. A01K 85/08
(52) U.S. Cl. ................. 43/42.25; 43/42.26; 43/42.27; 43/42.28
(58) Field of Search ................. 43/42.24, 42.25, 43/42.26, 42.27, 42.28

(56) References Cited

U.S. PATENT DOCUMENTS

| | | | |
|---|---|---|---|
| Re. 14,377 | 10/1917 | Cox | 43/42.27 |
| D. 87,374 | 7/1932 | Weber | 43/42.25 |
| 633,797 | 9/1899 | Cantrell | 43/42.25 |
| 862,150 | 8/1907 | Fredricks | 43/41 |
| 882,882 | 3/1908 | Henzel | 43/44.82 |
| 975,833 | 11/1910 | Cox | 43/42.25 |
| 1,505,235 | 8/1924 | Archer | 43/44.8 |
| 1,522,185 | 1/1925 | Hawes | 43/42.27 |
| 1,540,586 | 6/1925 | Adam | 43/42.26 |
| 1,635,644 | 7/1927 | Sloan | 43/42.25 |
| 1,994,692 | 3/1935 | Davenport | 43/42.27 |
| 2,187,666 | 1/1940 | Schumann | 43/42.27 |
| 2,216,929 * | 10/1940 | Zander et al. | 43/42.24 |
| 2,231,949 | 2/1941 | Rinehart | 43/42.27 |
| 2,242,708 | 5/1941 | Lancaster | 43/42.27 |
| 2,333,484 | 11/1943 | Miles | 43/42.28 |
| 2,423,431 | 8/1947 | Allen | 43/42.25 |
| 2,473,142 | 6/1949 | Gilmore | 43/42.26 |
| 2,611,985 | 9/1952 | Lloyd, Jr. | 43/42.25 |
| 2,741,058 * | 4/1956 | Allman | 43/42.24 |
| 2,785,497 * | 3/1957 | Berry | 43/42.26 |
| 3,120,074 * | 2/1964 | Messler | 43/42.28 |
| 3,133,371 | 5/1964 | Christensen | 43/42.25 |
| 3,148,474 * | 9/1964 | Smith | 43/42.24 |
| 3,165,858 * | 1/1965 | Rutter | 43/42.24 |
| 3,568,354 | 3/1971 | Yacko | 43/41 |
| 3,774,335 | 11/1973 | Sisty | 43/42.25 |

(List continued on next page.)

OTHER PUBLICATIONS

Orvis Fishing and Outdoor Catalog 1997, Orvis Fly–Fishing & Rod Building 1997, p. 188.

1998 Feather–Craft Fly Fishing Bulletin/Catalog, p. 40.

Orvis Fishing and Outdoor Catalog 1998, p. 89.

Orvis Fishing and Outdoor Catalog 1997, p. 75.

Primary Examiner—Darren W. Ark
(74) Attorney, Agent, or Firm—Young & Basile, PC

(57) ABSTRACT

An artificial fly/lure includes a body mounted about the shank of a hook. The body is formed of an open mesh weave material secured to the hook. A plurality of open mesh woven material appendages are secured to the body. The appendages project outwardly from the body to a freely movable outer end. A flexible rod is interposed within each appendage. The appendages in several aspects form wings to enable the artificial fly/lure to be constructed in the shape of a naturally occurring fish or insert, such as a flying fish, mayfly or grasshopper. Additional appendages in the form of legs may also be provided on certain of the lures. In another aspect, the body has angularly disposed ends from a central portion which carries the shank of the hook to form the lure in the natural shape of a worm.

16 Claims, 3 Drawing Sheets

U.S. PATENT DOCUMENTS

| | | | |
|---|---|---|---|
| 4,163,337 | 8/1979 | Kress | 43/42.25 |
| 4,186,510 | 2/1980 | Kimerer, Jr. | 43/42.25 |
| 4,280,296 | 7/1981 | Volenec | 43/44.81 |
| 4,559,736 | 12/1985 | Sienkiewicz | 43/42.25 |
| 4,862,630 | 9/1989 | Welch | 43/42.26 |
| 4,914,852 | 4/1990 | Hnizdor | 43/44.82 |
| 4,965,957 | 10/1990 | Hnizdor | 43/44.82 |
| 5,394,637 | 3/1995 | Hnizdor | 43/43.16 |
| 5,524,380 | 6/1996 | Hnizdor | 43/42.47 |
| 5,628,140 | 5/1997 | Hnizdor | 43/43.16 |
| 5,953,850 * | 9/1999 | Hnizdor | 43/42.26 |
| 6,003,264 * | 12/1999 | Hnizdor | 43/42.25 |
| 6,122,856 * | 9/2000 | Hnizdor | 43/42.25 |

\* cited by examiner

ARTIFICIAL FLY/LURE

CROSS REFERENCE TO CO-PENDING APPLICATION

This application is a continuation-in-part of patent application Ser. No. 09/314,084, filed May 18, 1999, now U.S. Pat. No. 6,122,856 the entire contents of which is incorporated herein by reference.

BACKGROUND OF THE INVENTION

1. Field of the Invention

The present invention relates, in general, to artificial flies and lures.

2. Description of the Art

Artificial flies and lures have been formed in a shape to attract different species of fish. In the case of artificial flies, a fly simulating a natural fly, insect or small bait fish is mounted on a hook. Such flies typically comprise a buoyant body, feathers, etc. Other fly bodies have also been formed merely in an insect or bait fish attractor shape. Various colors and/or design patterns have also been placed on such flies to attract fish under certain light conditions, water visibility, etc.

In the case of flies, the skills and artistic effort involved in constructing and assembling the various components to form a complete fly commonly results in what approaches a work of art. Besides having an aesthetic appeal, such flies are also effective in attracting fish. However, certain species of fish have large numbers of sharp teeth which destroy a fly when struck by such fish. Since the cost of flies can range from $1 to $10 or more, it can become quite expensive for a fisherman who is successful in landing a large number of fish by using relatively expensive flies.

Woven braid or mesh material formed of interwoven strands of a plastic, such as nylon, has been used to form various parts of artificial flies, such as a crab or squid body. Various appendages associated with such naturally occurring creatures are attached to the woven braid body. Such appendages include antenna, legs, wings, etc. However, such features have not necessarily resulted in an artificial fly or lure which closely resembles the naturally occurring sea creature it is simulating, such as a crab, squid, etc.

Thus, It would be desirable to provide an artificial fly or lure which is inexpensive in cost while having excellent fish attractor characteristics. It would also be desirable to provide an artificial fly/lure which is effective as a fish attractor and at the same time has a tough outer layer which resists damage when stuck by the sharp teeth of a fish. It would also be desirable to provide an artificial fly or lure which can be constructed of different shapes wherein the bodies and the appendages of such members are formed of woven mesh material.

SUMMARY OF THE INVENTION

The present invention provides is an artificial fly/lure formed of an woven, mesh body and appendages which exhibits unique characteristics not previously found in similar artificial flies or lures.

According to one aspect of the present invention, the artificial fly includes a hook having a shank, an eye at one end of the shank for connection, and a bend and tip at another end of the shank, and a hollow body with sidewalls formed of a continuous open mesh of crisscrossed strands with apertures therebetween opening to a hollow interior of the body. The shank is disposed in the body with at least the tip of the hook extending outward from one portion of the body and the eye of the shank extending outward from one end of the body.

A plurality of movable appendages extend from the body. The appendages are formed of a continuous, open mesh of crisscrossed strands with apertures therebetween opening to a hollow interior of each appendage. In one aspect, a flexible rod extends through each of the appendages. Opposite ends of the rod are fixed to opposite ends of each appendage. The flexible rod has a length shorter than a nominal length of the appendage to bend the appendage into a curved shape between the opposed ends.

In one aspect, the second ends of the appendages curve from the attachment point of the body toward the first end of the body and simulate wings. Two pairs of wings may be optionally provided where the artificial fly is in the form of a naturally occurring mayfly.

Each of the appendages can comprise a single tubular woven mesh member which is fixedly secured at a central portion to the body, such as by adhesive or threads, and has end portions projecting from the body to form wings, legs, arms, etc.

Where the artificial fly is constructed in the form of a grasshopper, at least one pair of appendages are in the form of legs which are joined at a first end to the body and have a second end angularly disposed with respect to the first end by a bend and moveably spaced from the body. A flexible rod extends through the legs to enable the legs to flex as the lure is drawn through the water. The grasshopper-shaped fly also includes additional appendages in the form of a pair of wings and front and middle legs. An enlarged head is formed on the grasshopper and has a pair of eyes projecting outwardly therefrom.

The artificial fly of the present invention can also take the form of a flying fish wherein the appendages are formed as curved wings projecting upwardly from the body. A tail is formed at the second end of the body.

The artificial fly of the present invention can also take the form of a worm wherein the flexible rod is secured at opposite ends to a single, tubular, mesh member, with the rod and the tubular member having end portions bent or otherwise formed at an angle with respect to an elongated, generally planar central portion. The eye of the hook extends outwardly from the central portion adjacent one end and the tip projects outwardly of the other angularly disposed end of the tubular member.

The present invention presents several different artificial flies or lures, all of which are constructed of tubular mesh material which has been formed into various shapes simulating flies, worms, or fish with the mesh material forming both the body and the appendages of such flies or lures. The use of the mesh material enables such artificial flies or lures to exhibit different actions in the water, such as floating on the surface, slowly drifting downward to the bottom of a lake or stream, moving along the bottom. All of these actions simulate the normal actions of an attractor fish.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
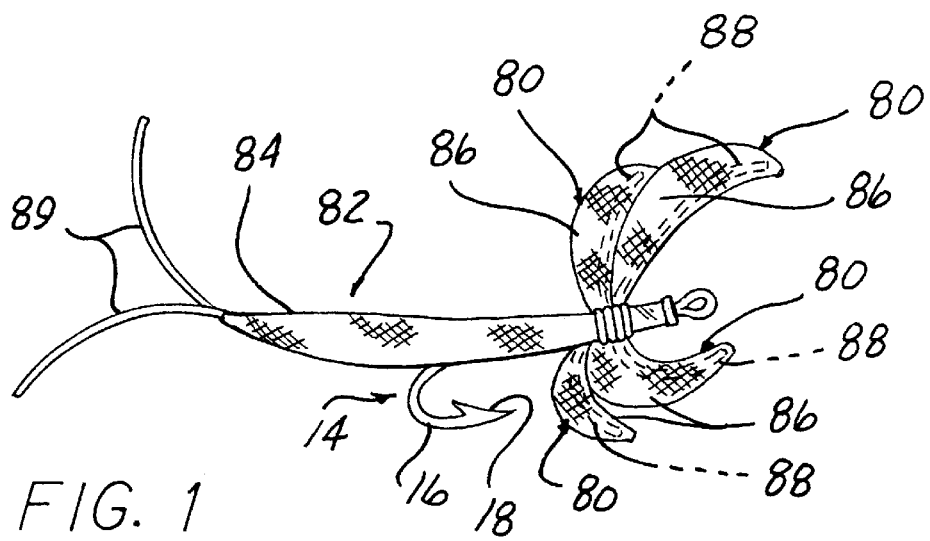
FIG. 1 is a side elevational view of yet another embodiment of the present invention in the form of a mayfly.

The present invention is usable both as an artificial fly or as a lure depending upon the type of fishing gear that is used by fishermen, such as fly tackle or conventional spinning or trolling gear. Further, it will be understood that the terms "fly" and "lure" are to be used interchangeably with all aspects of the present invention. Thus, the following description of the present invention as an artificial fly will be understood to equally encompass the use of the present invention as a lure.

In various configurations, the fly or lure of the present invention includes a body and appendages, such as legs, arms, wings, etc.

The body and appendages are formed of a mesh material having an open weave of crisscrossed strands or members defining apertures therebetween which open to a hollow interior within the body and a hollow interior within each other part.

Any suitable high strength yet flexible weave material may be employed for the body and appendages. By example only, in a preferred embodiment, the body and appendages are formed of a material sold under the tradename "Skuf-Jacket" by Bentley-Harris Manufacturing Co., Lionville, Pa. This material is sold in elongated cylindrical, tubular form which can be cut to an appropriate length. The material is available in at least three diameter sizes, with the smallest diameter having the tightest weave; i.e., the smallest openings between adjacent crisscross members; while the larger diameter has a more open, looser weave defined by larger apertures between the crisscrossed members.

The mesh material serves several important functions for the artificial fly/lure of the present invention. First, it provides a wear resistant outer layer for the artificial fly/lure which resists damage to the artificial fly/lure typically caused by the sharp teeth of game fish. Secondly, the openings or apertures between the crisscross weave members of each appendage, such as wings or legs, allow water to move through the hollow interior of each part. This, in conjunction with the flexible nature of each part, provides a unique pulsating movement of each appendage as the fly or lure is drawn through the water in a series of jerk-like movements, as described hereafter.

Further, a thin, flexible, rod, preferably formed of a monofilament fishing line, extends between and is joined to first and second ends of certain parts or the body of the fly/lure. The rod has a shorter length than the nominal length of the part or body which causes each tentacle or part to bend generally into a smoothly curved shape between the first and second ends. At the same time, the flexible rod enables each part and the body, despite being moved from its nominal position when being drawn through the water, to return to its original position when the pulling force is discontinued.

The hook employed in the present fly/lure may take the shape of any conventional fish hook which includes an eye at one end of an elongated, tubular shank. A bend is formed at the opposite end of the shank from the eye and curves in any one of a number of different shapes to a tip. Exemplary hooks which may be used in any of the fly/lures described hereafter are disclosed in Applicant's own U.S. Pat. Nos. 5,394,637, 5,440,832 and 6,006,468.

FIG. 1 depicts one aspect of the present invention in which tension rods 88 are employed in wings 80 of an artificial fly or lure in the shape of an insect, preferably a Mayfly 82. The insect or Mayfly 82 has an elongated body 84 formed of woven mesh material. A single hook 14 is mounted in the body 84, with a bend 16 and a tip 18 projecting downwardly below the body 84 in a normal use position of the Mayfly 82. A closed cell semi-rigid insert, such as an insert formed of styrofoam, not shown, is disposed interiorly within the body 84 between the interior surface of the body 84 and the upper portion of the shank of the hook to conform the body 84 to the desired elongated, generally cylindrical shape of a natural Mayfly. One or two short lengths of monofilament fishing lines 89 are attached to the tail or rear end of the body 84 to simulate a tail.

At least one pair and, preferably, a plurality of pairs of two opposed wings 86 are mounted on the body 84. Each separate wing 86 is formed of elongated mesh material having ends which are closed, such as by cauterization. Each pair of wings 86 is formed by tying a single tubular mesh member at a middle point to the body 84 to form two opposed, substantially equally sized and identically shaped wings 86. The frontmost pair of wings 86 can be larger than the rear pair of wings 86. A tensioning rod 88 having a length shorter than the overall length of the tubular member forming each pair of wings 86 is joined at opposite ends to the ends of each pair of wings 86 to cause each wing 86 to take a curved shape.

Figure 2:
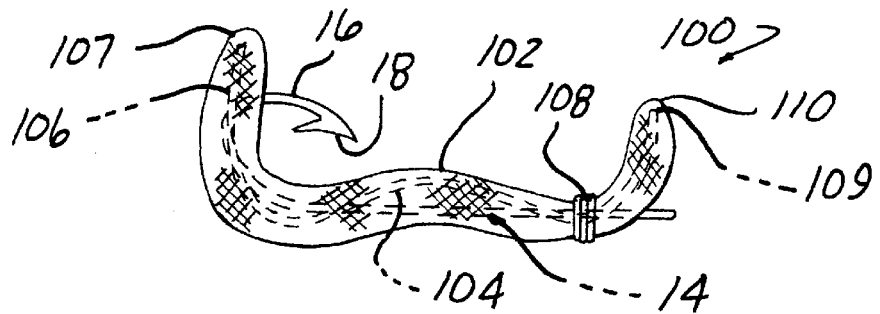
FIG. 2 is a side elevational view of a night crawler fly/lure according to the present invention.

FIG. 2 depicts the fly/lure in the form of a night crawler or worm 100 constructed in accordance with another aspect of the present invention. The worm 100 includes an elongated hollow body 102 formed of a woven mesh material having crisscross strands defining apertures opening to a hollow interior of the body 100. A flexible rod 104 is inserted through the hollow body 102. A first end 106 of the rod 104 is cauterized or otherwise fixedly attached to a first end 107 of the body 102. This also closes the first end 107 of the body 102. The body 102 and rod 104 are then twisted about the longitudinal axis of the shank 14 at various locations along the length of the body 102 to form a curved, irregular shape for the body 102 and rod 104 which closely simulates a natural night crawler or worm. The other end 109 of the rod 104 and the second end 110 of the body 102 are then cauterized to close the second end 110 of the body 102. The body 102 and rod 104 then retain the twisted shape. Next, a hook 14 is inserted through a bend in the body 102 with the bend 116 and tip 18 of the hook forced through the mesh forming the body 102. A thread 108 is tightly wound in a plurality of turns about the shank of the hook 14 behind the eye of the shank 14 at one bend in the body 102 to secure the body 102, the rod 104 and the hook together. The buildup of the turns of the thread 108 simulates a wedding band or enlarged ring typically found on night crawlers. The buoyancy of the body 102 and the outward turned ends of the body 102 cause the fly or lure 100 to ride in water tip point up as shown in FIG. 2.

Figure 3:
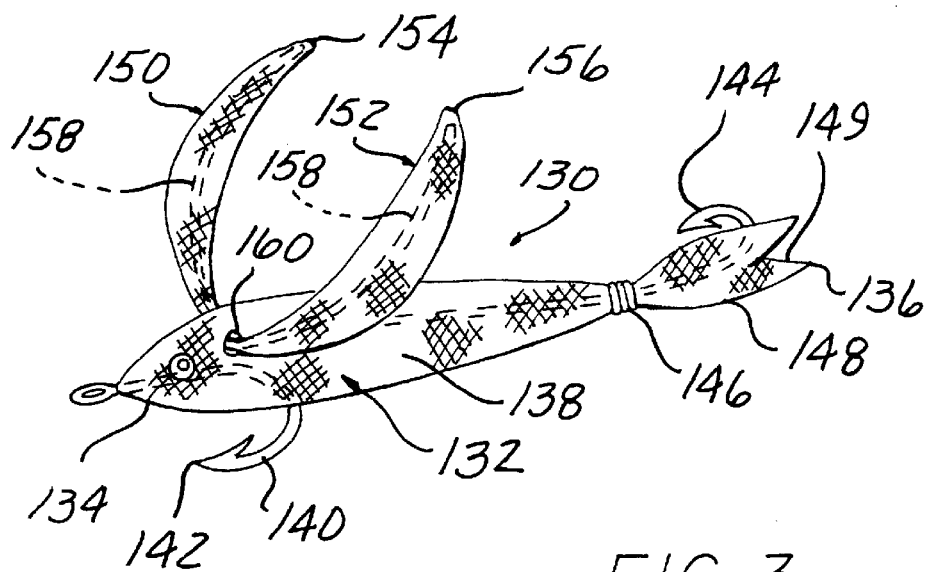
FIG. 3 is a perspective view of a flying fish lure according to the present invention.

Referring now to FIG. 3, there is depicted another aspect of an artificial fly/lure 130 according to the present invention. In this aspect, the fly/lure 130 is in the form of a flying fish, also hereafter referred to by reference number 130.

The flying fish 130 is formed of a body 132 constructed of the woven mesh material described above. The body has a first end 134 and an opposed second end 136. The body 132 may be left in a hollow, tubular shape or provided with a rigid or semi-rigid interior insert, such as a tubular body formed of a resilient material, such as foam, or a V-shaped, rigid member 138 described in Applicant's prior U.S. Pat. Nos. 5,628,140.

A hook is mounted within the body 132 and may take any of a variety of forms as described above. A bend 140 and a tip 142 of the hook are shown in FIG. 3 as extending from a normally oriented bottom of the body 132, with the tip 142 facing forward toward the first end 134 of the body 132.

If the tandem hook shown in Applicant's U.S. Pat. No. 6,006,468 is employed, the tip 142 of the front-most hook will face forward as shown in FIG. 3 and the tip 144 of the second or rear-most hook will also face forward, but be disposed along an opposite edge of the body 132, such as the top surface in a normal fishing orientation of the body 132.

In assembling the flying fish 130, a plurality of threads 146 are wrapped about the body 132 at a position spaced from the second end 136 to form a tail 148. The tail 148 may be shaped by trimming at a location 150 to a shape found on an actual flying fish.

The flying fish 130 is also provided with a pair of wings 150 and 152. The wings 150 and 152 are preferably formed of a single piece woven mesh, tubular member having opposed first and second ends 154 and 156, respectively. A flexible rod 158, typically a monofilament plastic line, is disposed within the interior of the one piece member forming the wings 150 and 152 and has a shorter length than the nominal length of the one piece member. In this manner, when the one piece member is inserted through an aperture 160 in the insert 138 in the body 132, the wings 150 and 152 projecting oppositely outward therefrom. The rod 158 in each wing 150 and 152 will assume a curved shape thereby causing each wing 150 and 152 to develop a curve or airfoil shape typically found in an actual flying fish. The one-piece member forming the wings 150 and 152 is fixedly secured in the aperture 160, by threads or, preferably, by adhesive.

The body 132, when formed of a hollow tubular member without an insert 134, may be flattened to a generally oval cross section of an actual flying fish. The woven mesh material has shape memory so as to retain the flattened shape. Likewise, the wings 150 and 152 may also be flattened to a more oval shape similar to that found in an actual flying fish.

In addition, the threads 146 adjacent the second end 136 of the body 132 as well as the shaped tail 150 may be provided with an adhesive coating so as to retain the threads and the shaped tail in a fixed, non-changeable shape.

Figure 4:
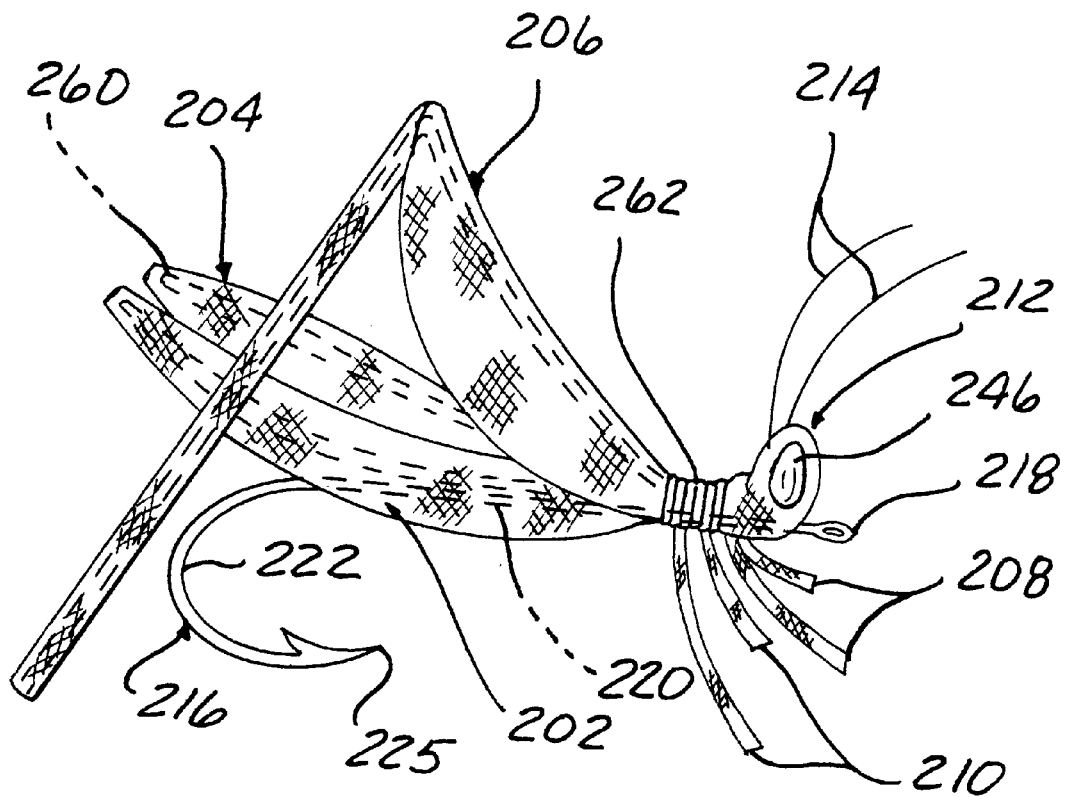
FIG. 4 is a perspective view of a grasshopper shaped fly/lure according to the present invention.

Referring now to FIGS. 4 and 5A–5C, there is depicted another aspect of an artificial fly/lure according to the present invention which is constructed in the shape of an insert, such as a grasshopper 200. The grasshopper 200 includes a body 202, a pair of wings, both denoted by reference number 204, a pair of rear legs 206, only one of which is shown in FIG. 4, a pair of front legs 208, a pair of middle legs 210, a head 212 and a pair of optional antenna 214. A hook 216 having an eye 218 at one end of a shank 220 projects through the head 212 of the grasshopper body 202.

The shank 220 is disposed internally within the body 202, a bend 222 and a tip 224 are provided with the bend 222 and tip 224 projecting from an intermediate portion of the body 202 along a bottom surface of the body as shown in FIG. 4.

Figure 5A:
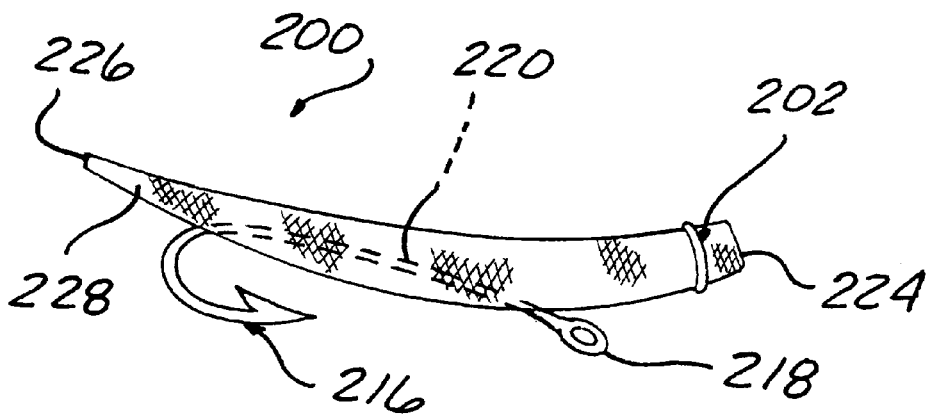
FIG. 5A is a side perspective view showing an initial stage in the assembly of the grasshopper fly/lure shown in FIG. 4.
Figure 5B:
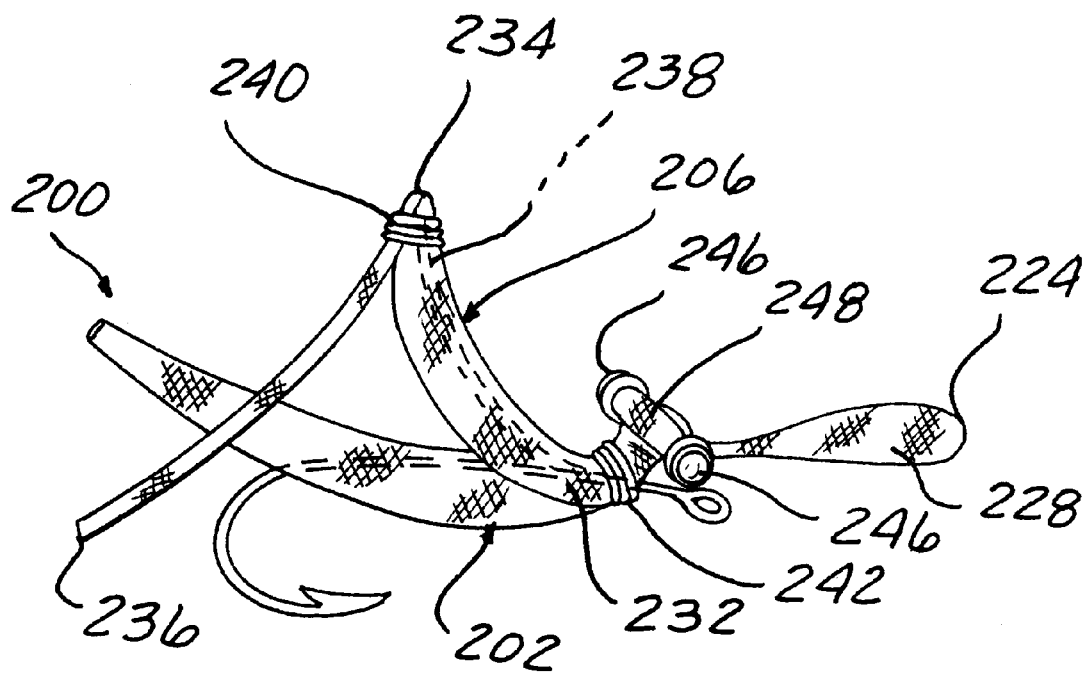
FIG. 5B is a side perspective view of a subsequent stage in the assembly of the grasshopper fly/lure shown in FIG. 4.
Figure 5C:
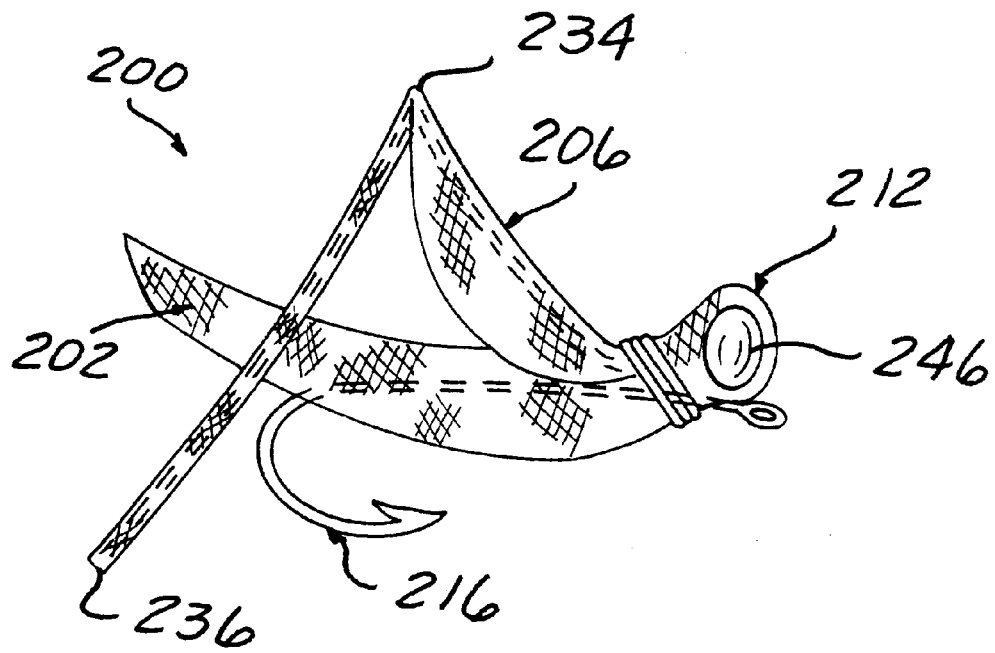
FIG. 5C is a side perspective view of the grasshopper fly/lure of FIG. 5B, with the head complete

Assembly of the grasshopper 200 takes place in various stages as shown in FIGS. 5A–5C. Referring first to FIG. 5A, an elongated tubular body 202 is formed of the above described woven mesh material. The body 202 has a first end 224 and an opposed second end 226. The second end 226 is closed, such as by being cauterizing, before an insert, such as resilient foam insert 228 is inserted through the open first end 224 through the length of the body 202 into an end portion ending at the second end 226. The hook 216 is then inserted through the body 202 until it assumes the position shown in FIG. 5A. It should be noted at this stage of the assembly of the grasshopper 200 that the eye 210 of the hook 216 projects from the body 202 intermediately of the first and second ends 224 and 226. The shank 220 of the hook 216 can be tied to the body 202 adjacent to the eye 210.

Next, the pair of rear legs 206 are separately formed from a one-piece tubular mesh body and have a first end 232, an intermediate bend 234 and an opposed second end 236.

A flexible rod 238 having a shorter length than the overall length of the leg 206 between the first and second ends 232 and 236 is disposed interiorly within each leg 206 and fixedly secured to the first and second ends 232 and 236 of the leg 206, such as by tying, adhesive, cauterization, etc.

Each leg 206 is then bent at the intermediate point 234 to the two-part angular shape shown in FIG. 5B. A plurality of threads 240 are wrapped around the intermediate point 236 to maintain the leg 206 in the two-part, angular shape. The rod 238 forms a first portion of each leg 206 between the first end 232 and the intermediate point 234 in a generally arcuate shape. The rod 238 also provides an generally arcuate shape to a second portion of each leg 206 extending from the intermediate point 234 to the second end 236. It should be noted that the second end 236 is freely movable with respect to the body 202. The first end 234 is secured to the body 202 by a plurality of threads 242 wrapped around the end 232 and the body 202.

A pair of eyes 246 are formed by melting two opposed ends of a short length of monofilament line disposed within a short tubular woven mesh sleeve 248. The melted ends form a generally spherical shape resembling eyes, particularly if black colored monofilament line is used. A plurality of threads are wound around the sleeve 248 to attach the sleeve 248 to the body 202 adjacent to the attachment point of the first end 232 of each leg 206 to the body 202. The excess front most end portion of the body 202 extending from the eyes 246 to the first end 224 of the body 202 and the internally disposed end of the insert 228 are then folded over the eyes 246 and the threads 242 to complete the enlarged head 250 as shown in FIG. 5C.

The pair of wings 204, only one of which is shown in FIG. 4, each formed of an elongated, generally flattened tubular woven mesh body, similar to the wings 150 and 152 on the flying fish 130 shown in FIG. 3, and have an internal tension rod 260 to form each wing 204 into a generally arcuate shape between opposed ends. Each wing 204 is attached at one end by a plurality of threads 262 to the body 202 behind the head 250.

Finally, front and middle pairs of legs 208 and 210, each formed of a small diameter, tubular mesh material, are attached to the body 202 below the head 250 by a "figure eight" wound threads to form two depending appendages on opposite sides of the body 202 as shown in FIG. 4.

As noted above, the tension rods in the various appendages of the body of the grasshopper 200 maintain the various wings 202 and legs 206 in the desired shape. However, forces exerted on the grasshopper 200, such as during a pulling movement of the fly/lure through the water will cause the wings 204 and legs 206 to flutter or move simulating the movement of a natural grasshopper in the water. This creates an irresistible lure to a fish.

The optional antenna 214 are in the form of a single monofilament line tied or secured in the middle to the head 250.

In summary, the present invention uses a tubular, woven mesh material to form bodies and other appendages of an artificial fly/lure which simulates a naturally occurring fish or insect.

What is claimed is:

1. An artificial fly comprising:
   a body having first and second ends, the body formed of a continuous mesh of crisscrossed strands with apertures therebetween opening to an interior of the body;
   a flexible rod having opposed ends, one end of the flexible rod fixedly secured to the first end of the body, the other end of the rod fixedly secured to the second end of the body, the rod having a nominal length shorter than the nominal length of the body to form the body in a non-linear shape;
   a hook having an eye at a first end, a shank projecting from the eye, a bend at an opposite end of the shank from the eye, the bend terminating in a tip, the eye and the shank projecting from the body; and
   a thread wound around the body, rod, and shank securing the body to the shank of the hook.

2. The artificial fly of claim 1 wherein the first and second ends of the body are angularly disposed from a central portion of the body.

3. An artificial fly comprising:
   a hollow body having a sidewall formed of a continuous open mesh of crisscrossed strands with apertures therebetween opening to an interior of the body, the body having first and second ends;
   a hook disposed within the body and having a tip projecting exteriorly of the body;
   at least one appendage having opposed first and second ends, the at least one appendage fixed to the body, the at least one appendage formed of a hollow mesh material; and
   a flexible rod disposed within the at least one appendage and having a length shorter than the nominal length of the at least one appendage, one end of the flexible rod fixed to the first end of the at least one appendage and the other end of the rod fixed to the second end of the at least one appendage to bend the at least one appendage into a curved shape between the opposed first and second ends.

4. The artificial fly of claim 3 wherein:
   the second end of the at least one appendage curves from an attachment point on the body toward the first end of the body.

5. The artificial fly of claim 4 wherein the at least one appendage comprises:
   two pairs of wings, each having opposed ends.

6. The artificial fly of claim 3 wherein:
   the at least one appendage comprises a single tubular woven mesh member fixedly attached to the body and having end portions projecting from the body to the first and second ends of the at least one appendage.

7. The artificial fly of claim 3 further comprising:
   a rigid insert disposed within the body adjacent to the second end of the body;
   the at least one appendage projecting rearward along the body from the first end of the body; and further comprising:
   at least one pair of legs, each leg joined at a first end to the body and having a second end freely movably spaced from the body.

8. The artificial fly of claim 7 wherein each leg further comprises:
   an elongated tubular member having first and second ends and an intermediate bend;
   a flexible rod extending through the tubular member and having one end attached to the first end of the tubular member and an opposite end attached to the second end of the tubular member, the flexible rod having a length shorter than the nominal length of the tubular member; and
   each leg having two leg portions extending angularly from the intermediate bend.

9. The artificial fly of claim 7 wherein:
   the at least one pair of legs is joined to the body adjacent to the first end of the body.

10. The artificial fly of claim 7 further comprising:
    an enlarged head formed on the first end of the body.

11. The artificial fly of claim 10 further comprising:
    a pair of eyes projecting from the head.

12. The artificial fly of claim 3 further comprising:
    the body having a flattened, oval cross section.

13. The artifical fly of claim 12 further comprising:
    a tail formed on the second end of the body.

14. The artificial fly of claim 12 further comprising:
    the tip of the hook extending from the body and along one edge of the body toward the first end of the body.

15. The artificial fly of claim 14 wherein the at least one appendage comprises:
    a pair of wings projecting outwardly from opposite sides of the body.

16. The artificial fly of claim 15 further comprising:
    a tail formed on the second end of the body.

* * * * *